US012791462B2

(12) United States Patent
Lychagov et al.

(10) Patent No.: US 12,791,462 B2

(45) **Date of Patent: *Nov. 10, 2026**

(54) MULTIMODAL DUST SENSOR

(71) Applicant: SAMSUNG ELECTRONICS CO., LTD., Suwon-si (KR)

(72) Inventors: Vladislav Valerievich Lychagov, Saratov (RU); Elena Konstantinovna Volkova, Saratov (RU); Artem Yurevich Klimchuk, Tambov (RU); Alexey Vyacheslavovich Perchik, Moscow (RU); Vladimir Mikhailovich Semenov, Moscow region (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

This patent is subject to a terminal disclaimer.

(21) Appl. No.: 18/388,148

(22) Filed: Nov. 8, 2023

(65) Prior Publication Data

US 2024/0077405 A1 Mar. 7, 2024

Related U.S. Application Data

(63) Continuation of application No. 17/294,905, filed as application No. PCT/KR2019/015883 on Nov. 19, 2019, now Pat. No. 11,841,311.

(30) Foreign Application Priority Data

Nov. 19, 2018 (RU) ................................ 2018140733
Nov. 19, 2019 (KR) ........................ 10-2019-0148906

(51) Int. Cl.
*G01N 15/1434* (2024.01)
*G01N 15/00* (2024.01)
(Continued)

(52) U.S. Cl.
CPC ..... *G01N 15/1434* (2013.01); *G01N 15/0205* (2013.01); *G01N 15/06* (2013.01);
(Continued)

(58) Field of Classification Search
None
See application file for complete search history.

(56) References Cited

U.S. PATENT DOCUMENTS 4,957,363 A 9/1990 Takeda
5,039,613 A * 8/1991 Matsuda ............ G01N 15/1456 252/301.19

(Continued)

FOREIGN PATENT DOCUMENTS

CN 106383097 2/2017
DE 10117048 8/2002

(Continued)

OTHER PUBLICATIONS

Translation of Kinugasa (KR 20140000152 A) (Year: 2014).*

(Continued)

*Primary Examiner* — Rufus L Phillips

(74) *Attorney, Agent, or Firm* — Nixon & Vanderhye, P.C.

(57) ABSTRACT

Example embodiments relate to dust concentration measurement and to dust composition and particle size determination. Multimodal dust sensor is able to simultaneously determine the concentration, size and origin of dust particles in real time. Method of operation of a single measurement channel of the multimodal dust sensor comprises: collimating laser radiation; splitting the laser radiation into two beams: a first beam and a second beam; and focusing the first beam to form a probe volume, wherein a dust particle entering the probe volume: a) scatters the first beam, thereby providing a homodyne mode of operation, in which the (Continued)

second beam and the scattered first beam are combined; the combined radiation falls on the photodetector that registers the Doppler effect; and/or b) fluoresces, thereby providing a fluorescent mode of operation, in which the fluorescent light falls on the photodetector that registers the fluorescent light.

16 Claims, 6 Drawing Sheets

(51) Int. Cl.

| | |
|---|---|
| ***G01N 15/0205*** | (2024.01) |
| ***G01N 15/06*** | (2024.01) |
| ***G01N 15/14*** | (2024.01) |
| ***G02B 3/00*** | (2006.01) |

(52) U.S. Cl.
CPC ... *G02B 3/0037* (2013.01); *G01N 2015/0046* (2013.01); *G01N 2015/1454* (2013.01); *G01N 2015/1493* (2013.01)

(56) References Cited

U.S. PATENT DOCUMENTS

| | | | | |
|---|---|---|---|---|
| 5,760,900 | A * | 6/1998 | Ito ...................... | G01N 15/1434 356/73 |
| 5,878,160 | A * | 3/1999 | Horiuchi ............ | G01N 15/1459 382/133 |
| 6,380,503 | B1 | 4/2002 | Mills et al. | |
| 7,019,310 | B2 | 3/2006 | Kask | |
| 7,038,189 | B2 | 5/2006 | Kawai | |
| 7,705,987 | B2 | 4/2010 | Maiti et al. | |
| 7,738,099 | B2 | 6/2010 | Morrell et al. | |
| 8,248,700 | B1 | 8/2012 | Zorabedian | |
| 9,488,575 | B2 | 11/2016 | Kim et al. | |
| 9,857,287 | B2 | 1/2018 | Dittrich et al. | |
| 9,869,625 | B2 | 1/2018 | Spriggs et al. | |
| 9,945,770 | B2 | 4/2018 | Ayliffe | |
| 11,169,076 | B2 * | 11/2021 | Yan ........................ | G01N 21/47 |
| 11,662,292 | B2 * | 5/2023 | Ohyama ............ | G01N 15/0211 356/338 |
| 2004/0075049 | A1 | 4/2004 | Stowers | |
| 2004/0207836 | A1 | 10/2004 | Chhibber et al. | |
| 2005/0168823 | A1 | 8/2005 | Ishii | |
| 2006/0244965 | A1 | 11/2006 | Ichijo | |
| 2007/0081236 | A1 | 4/2007 | Tearney et al. | |
| 2008/0085550 | A1 | 4/2008 | Werner et al. | |
| 2009/0323058 | A1 | 12/2009 | Dyba | |
| 2009/0323061 | A1 | 12/2009 | Novotny | |
| 2011/0210002 | A1 | 9/2011 | Hsieh et al. | |
| 2011/0267604 | A1 | 11/2011 | Swalwell | |
| 2012/0044493 | A1 | 2/2012 | Smart | |
| 2012/0161033 | A1 | 6/2012 | Kwon et al. | |
| 2012/0257192 | A1 | 10/2012 | Jiang | |
| 2012/0315666 | A1 * | 12/2012 | Fujioka ............. | G01N 15/0612 435/39 |
| 2013/0077087 | A1 | 3/2013 | Janka et al. | |
| 2014/0226158 | A1 | 8/2014 | Trainer | |
| 2014/0295536 | A1 | 10/2014 | Yamada | |
| 2014/0354976 | A1 * | 12/2014 | Evenstad ............... | G01N 21/65 356/73 |
| 2015/0182118 | A1 | 7/2015 | Bradbury et al. | |
| 2015/0260628 | A1 | 9/2015 | Shamir | |
| 2015/0293032 | A1 | 10/2015 | Babichenko | |
| 2015/0309399 | A1 | 10/2015 | Kim | |
| 2016/0238510 | A1 | 8/2016 | Bachalo et al. | |
| 2016/0299060 | A1 | 10/2016 | Hokanson et al. | |
| 2016/0320306 | A1 | 11/2016 | Huffman et al. | |
| 2017/0176353 | A1 | 6/2017 | Chen et al. | |
| 2017/0268981 | A1 | 9/2017 | Diebold | |
| 2017/0276608 | A1 | 9/2017 | Kanarowski | |
| 2017/0307495 | A1 | 10/2017 | Corbett | |
| 2017/0322133 | A1 | 11/2017 | Trainer | |
| 2017/0350806 | A1 | 12/2017 | Sinha et al. | |
| 2018/0024040 | A1 * | 1/2018 | Yan ........................ | G01J 3/021 435/288.7 |
| 2018/0128744 | A1 | 5/2018 | Goradia et al. | |
| 2018/0136043 | A1 | 5/2018 | Arnold et al. | |
| 2018/0209779 | A1 | 7/2018 | Van Der Lee et al. | |
| 2018/0224368 | A1 | 8/2018 | Spruit | |
| 2018/0275097 | A1 | 9/2018 | Dar | |
| 2018/0284018 | A1 | 10/2018 | Pang | |
| 2019/0094140 | A1 * | 3/2019 | Han ....................... | G01N 21/47 |
| 2019/0302025 | A1 | 10/2019 | Jung et al. | |
| 2020/0232921 | A1 | 7/2020 | Kim et al. | |
| 2020/0292435 | A1 | 9/2020 | Spruit | |

FOREIGN PATENT DOCUMENTS

| | | | | |
|---|---|---|---|---|
| EP | 2 756 283 | | 3/2016 | |
| JP | 5275804 | | 8/2013 | |
| KR | 10-1226445 | | 1/2013 | |
| KR | 20140000152 | A * | 1/2014 | ......... G01N 15/1434 |
| KR | 20170060359 | A | 6/2017 | |
| KR | 10-1810078 | | 12/2017 | |
| KR | 10-2018-0020143 | | 2/2018 | |
| KR | 10-2018-0082159 | | 7/2018 | |
| KR | 10-2019-0024028 | | 3/2019 | |
| RU | 103920 | U1 | 4/2011 | |
| WO | 2014/075724 | | 5/2014 | |

OTHER PUBLICATIONS

Liquid Crystal Devices Handbook // Japan Society for the Promotion of Science No. 142 Edited by the committee, translated by Huang Ximin and others, Hangzhou Kong Industrial Press, Aug. 31, 1992 and translation.
Photography Dictionary, Editor of the Editorial Board of Photography Dictionary, Zhejiang Photography Publishing House, Dec. 31, 2000 and translation.
Office Action dated Feb. 23, 2024 in CN Application No. 201980075797.2 and English-languge translation.
International Search Report for PCT/KR2019/015883, mailed Mar. 4, 2020, 4 pages.
Written Opinion of the ISA for PCT/KR2019/015883, mailed Mar. 4, 2020, 3 pages.
Office Action for RU201814073, with English translation, dated May 30, 2019, 8 pages.
Search Report for RU201814073, with English translation, date of completion May 29, 2019, 4 pages.
Extended Search Report dated 2021-10-20 in counterpart European Application No. 19886872.1.
Mack, A. R. et al., "Laser fluorescence of sand and clay materials." Canadian Journal of Soil Science, vol. 57, No. 1, 1977, pp. 1-8.
Urbanczyk, Justyna et al., "Spectral fluorescence variation of pollen and spores from recent peat-forming plants," International Journal of Coal Geology, 131 (2014) pp. 263-273.
Pan, "Detection and characterization of biological and other organic-carbon aerosol particles in atmosphere using fluorescence," Journal of Quantitative Spectroscopy & Radiative Transfer, 150 (2015), pp. 12-35.
Voloshina, O. V. et al., "Fluorescence detection of protein content in house dust: the possible role of keratin," Indoor Air (2017), 27:377-385.
Communication pursuant to Article 94(3) EPC dated Jul. 28, 2022 in EP Application No. 19 886 872.1.
Office Action dated Jan. 12, 2022 in IN Application No. 202117022256 and English-language translation.
Lychagov et al., U.S. Appl. No. 17/294,905, filed May 18, 2021.

* cited by examiner

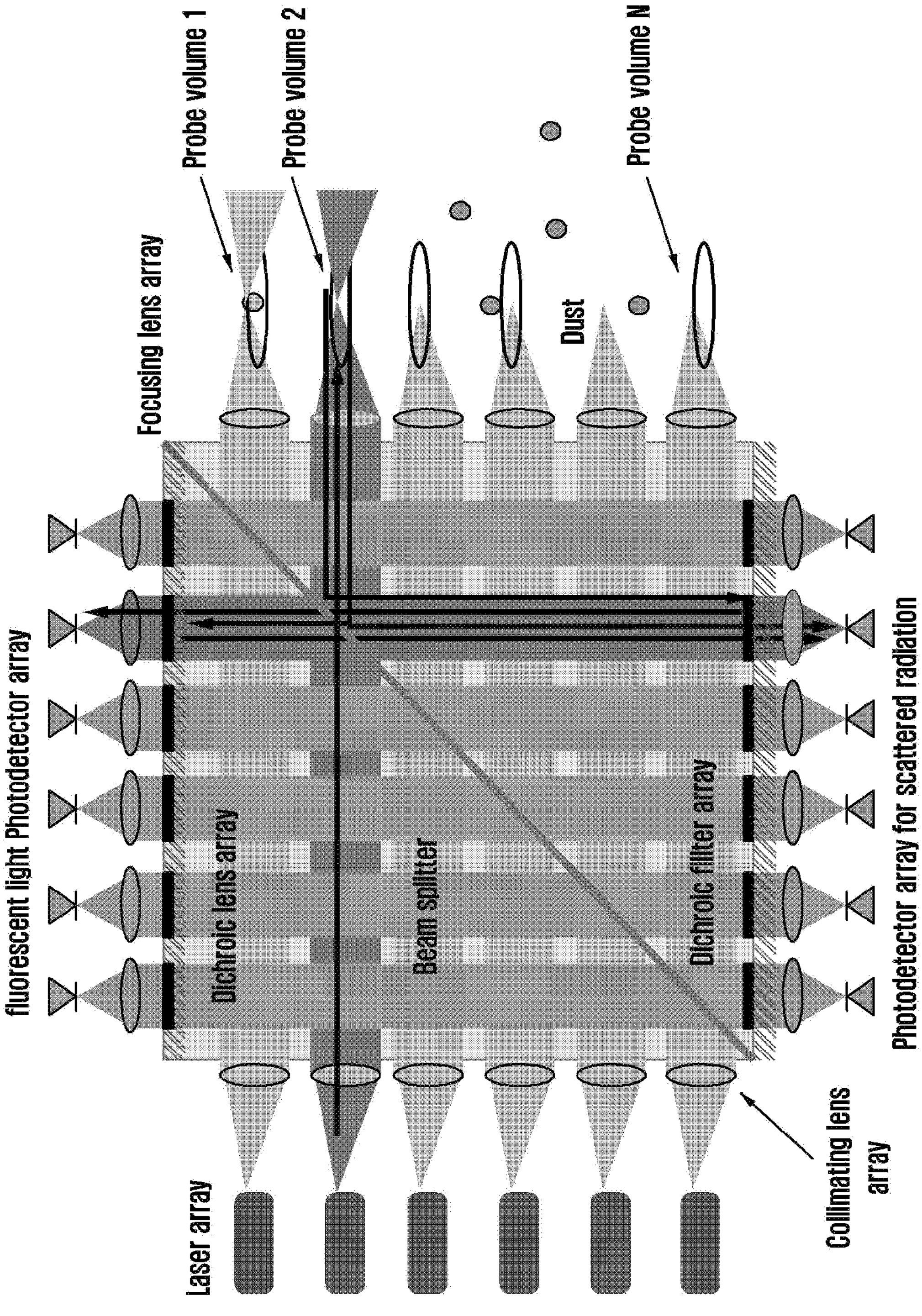
[Figure 1]

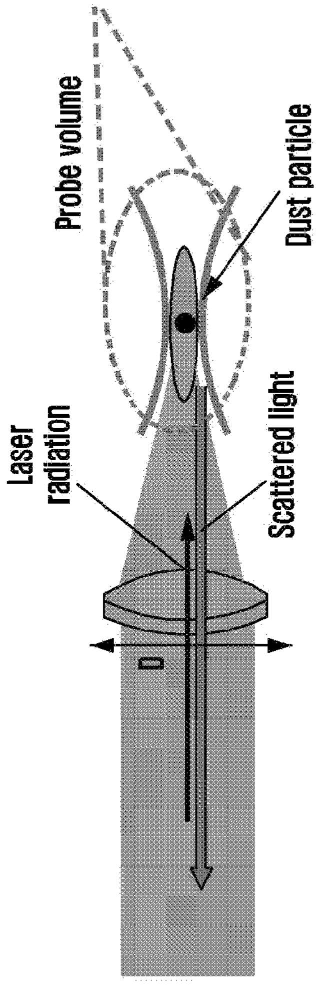
[Figure 2]

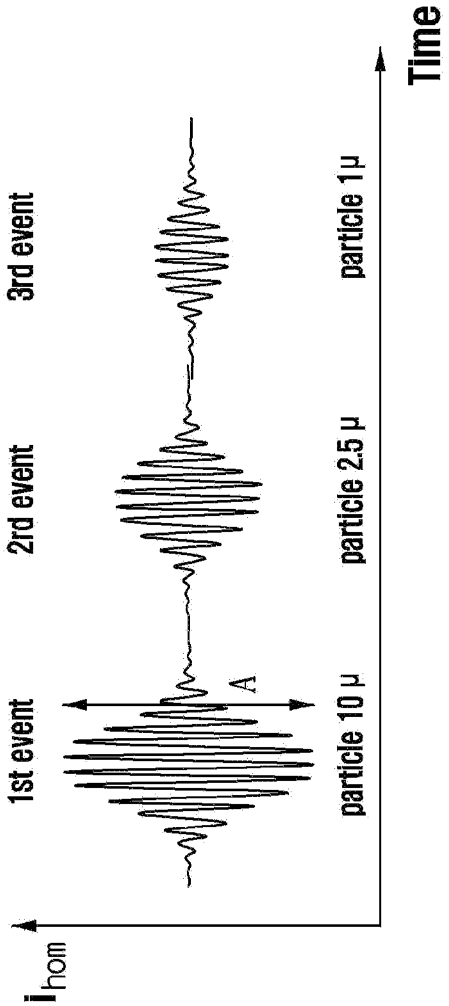
[Figure 3]

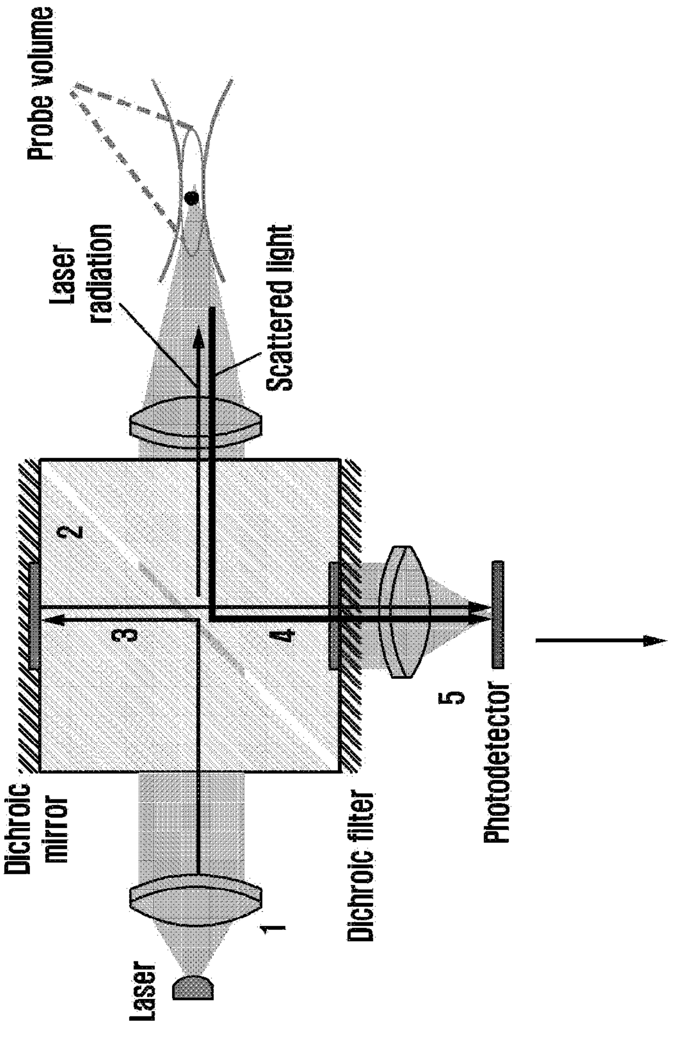
[Figure 4]

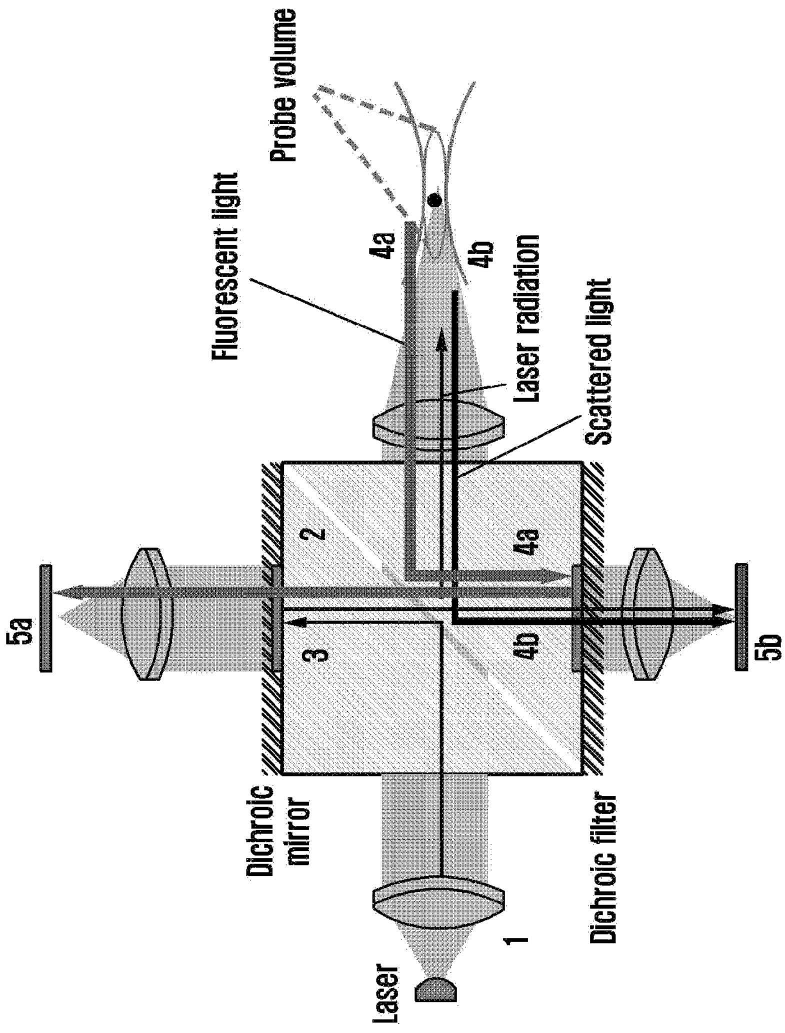
[Figure 5]

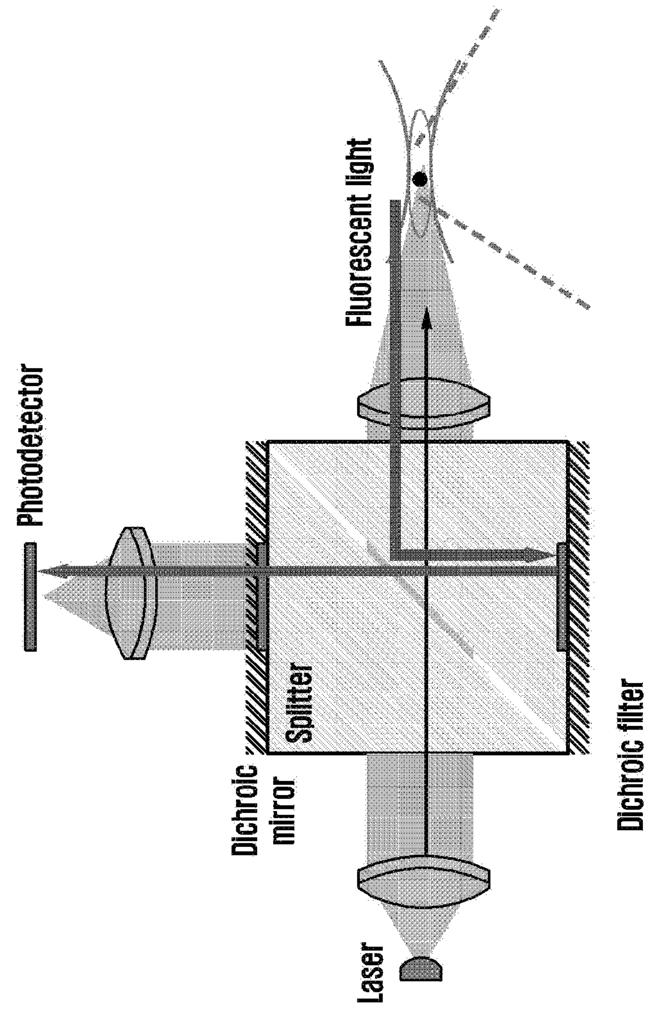
[Figure 6]

MULTIMODAL DUST SENSOR

CROSS-REFERENCE TO RELATED APPLICATIONS

This application is a continuation of Ser. No. 17/294,905, filed on May 18, 2021, now U.S. Pat. No. 11,841,311, which is the U.S. national phase of International Application No. PCT/KR2019/015883, designating the United States, filed on Nov. 19, 2019, in the Korean Intellectual Property Receiving Office and claiming priority to Korean Patent Application No. 10-2019-0148906, filed on Nov. 19, 2019, and Russian Patent Application No. 2018140733, filed on Nov. 19, 2018, the disclosures of all of which are incorporated by reference herein in their entireties.

BACKGROUND

Field

The disclosure relates to dust concentration measurement and to dust composition and particle size determination.

Description of Related Art

To date, a variety of dust detection devices have been developed, such as weather stations, air purifiers, air conditioners with dust sensors, etc. However, meteorological station equipment is large, expensive, sophisticated and can be used by experts only. Currently, the laboratory testing equipment with an air chamber and filter weighing is the gold standard for professional safety specialists, but it requires complicated sampling and measurement process; moreover, the equipment is expensive and cumbersome. Common consumer electronics with dust removal function, such as air purifiers and air conditioners, generally use optical LED sensors with a size from 5 cm×3 cm×2 cm, but such devices can measure only large concentrations of dust and are not able to separate dust into fractions by size and determine the dust origin.

U.S. Pat. No. 7,038,189 B2 (publication date 2 May 2006) discloses an optoelectronic dust sensor and air conditioning equipment in which such optoelectronic dust sensor is installed. Optoelectronic dust sensors of this type are used in air filters, air scrubbers, air coolers, and other similar air conditioning devices for detecting presence, absence, and/or concentration of dust and/or smoke circulating within air conditioning equipment. In the event that there is dust and/or smoke, because a portion of the light from light-emitting unit will be reflected by the dust and/or smoke, the amount of light received at light-receiving unit will increase. The prior art has the following drawbacks: it can be used only in a closed test chamber and needs airflow for operation; the device is not embeddable in a smartphone, is not able to differentiate particle sizes and does not provide information on the dust origin.

U.S. Pat. No. 9,857,287 B2 (publication date 2 Jan. 2018) discloses a particulate sensor device. An optical emitter device comprises a VCSEL laser. A particle sensor analyzes the emitted optical radiation and/or the scattered optical radiation by the self-mixing interference effect in the laser.

In other words, the self-mixing interference effect, which can be sensed e.g. by an integrated photodiode, is used to detect light scattered from a particle. The drawback of the prior art is that no dust origin information is provided.

The prior art most closely related to the disclosure is disclosed in US 2014/0226158 A1 (publication date 14 Aug. 2014). The patent discloses methods and apparatus for determining particle characteristics. The apparatus comprises illuminating means for illuminating one or more particles; detecting means for detecting light scattered from one or more particles; a reflector for directing light from the illuminating means to the detecting means, wherein light reflected from the reflector is combined with light scattered from one or more particles to produce an optical interference signal. Drawbacks of the prior art include the inability of determining the dust origin and measuring the concentration of particles. Furthermore, in the patent the test is carried out in a chamber rather than in free space, i.e. air is pumped from free space into the test chamber.

U.S. Pat. No. 9,488,575 B2 (publication date 8 Nov. 2016) readjusts conventional dust sensors to apply them in mobile devices. The mobile device comprises a housing having an air flow path through which air flows in response to the mobile device being shaken. The device further comprises an inertia sensor; a light-scattering type sensor configured to irradiate the air flow path with light and detect particulate matter in air flowing though the air flow path; and a controller which comprises a counter configured to count the particulate matter detected by the light-scattering type sensor, and a flow rate calculator configured to detect an air flow rate of the air passing though the air flow path based on the detection signal of the inertia sensor. Drawbacks of the prior art include the absence of particle size estimation and dust origin information.

Most of the existing dust detection devices are too cumbersome and cannot be embedded into small mobile devices such as smartphones; moreover, the conventional dust detection devices yield little information.

Furthermore, the dust sensing range in the existing devices is limited by only one ability: concentration or size or origin of dust particles. Moreover, dust sensors in conventional devices operate in a mode that requires pumping a sample of ambient air through an analyzing device.

SUMMARY

Aspects of the disclosure is to provide a method and a sensor for ensuring high sensitivity of the device owing to the fact that measurements are taken at multiple points through the use of optical element arrays.

According to an embodiment of the disclosure, the simultaneously implemented fluorescent mode and homodyne mode in the measurement channel of the optical circuitry of the present sensor enable obtaining information about the size, concentration and origin of particles at the same time.

In accordance with an aspect of the disclosure, a multimodal dust sensor may include: an array of lasers; an array of collimating lenses, each of the collimating lenses arranged after a respective laser; an array of focusing lenses, each of the focusing lenses disposed opposite a respective collimating lens; wherein each laser from the array of lasers with the respective focusing and collimating lenses are arranged on the same optical axis, and optical axes for different lasers from the array of lasers are parallel to each other and form a first array of optical axes; a first array of photodetectors; an array of dichroic mirrors, each of the dichroic mirrors being followed by one of photodetectors of the first array of photodetectors; a second array of photodetectors; an array of dichroic filters, each of the dichroic filters being followed by one of photodetectors of the second array of photodetectors; wherein each dichroic filter is disposed opposite a respective dichroic mirror such that each dichroic filter with its respective elements: a photodetector of the second array of photodetectors, a dichroic minor, a photodetector of the first array of photodetectors are arranged on the same optical axis, and said axes form a second array of optical axes; wherein optical axes of the first array of optical axes and the second array of optical axes are perpendicular to each other; a beam splitter disposed between the array of dichroic filters and dichroic mirrors and between the arrays of focusing and collimating lenses at the intersection points of optical axes of the first and second arrays of optical axes; wherein the beam splitter is oriented such that the radiation propagating along the optical axis of the first array of optical axes from the laser to the focusing lens is partially directed along one of the optical axes of the second array of optical axes towards one of their dichroic filters; wherein the radiation propagating along the optical axis of the second array of optical axes in the opposite direction from the focusing lens to the collimating lens is partially directed along the respective optical axis of the second array of optical axes towards the dichroic mirror, and each pair of optical axes from the first and second array of optical axes, intersecting at a point located on the splitter, forms a measurement channel.

The array of lasers consists of lasers operating at the same wavelength. Furthermore, the array of lasers can consist of lasers operating at different wavelengths.

The first photodetector registers only combined scattered and laser radiation, the dichroic mirror reflects laser radiation, and the dichroic filter transmits the combined scattered and laser radiation. The second photodetector registers only fluorescent light, the dichroic mirror transmits fluorescent light and reflects laser radiation, the dichroic filter reflects fluorescent light.

The focusing lenses can be liquid crystal.

In accordance with still another example aspect of the disclosure, a method of operation of a single measurement channel of a multimodal dust sensor may include: collimating laser radiation; splitting the laser radiation into two beams (e.g., a first beam and a second beam); and focusing the first beam to form a probe volume, wherein, a dust particle entering the probe volume:

a) scatters the first beam, thereby providing a homodyne mode of operation, in which the second beam and the scattered first beam are combined; the combined radiation falls on the photodetector that registers the Doppler effect; and/or
b) fluoresces, thereby providing a fluorescent mode of operation, in which the fluorescent light falls on the photodetector that registers the fluorescent light.

Signal in the homodyne channel has the following characteristics:

- amplitude depends on the particle size;
- duration (time of flight of a particle through the probe volume) and the modulation frequency of the signal depends on the velocity of the particle.

Signal in the fluorescent channel has the following characteristics:

- amplitude depends on the particle origin (main contribution) and particle size (much less significant contribution);
- duration (time of flight of a particle through the probe volume) of the signal depends on the velocity of the particle.

According to various embodiments of the disclosure, it is possible to ensure high accuracy in determining low concentrations of dust particles in air, including single dust particles, and simultaneous detection of concentration, size and origin of dust particles. Moreover, the sensor has a compact design suited for embedding into mobile devices, including e.g. smartphones. With the disclosure, ambient air quality can be monitored using a smartphone having a dust sensor application.

BRIEF DESCRIPTION OF THE DRAWINGS

The above and other features and advantages of the present invention are explained in the following description illustrated by the drawings, in which:

FIG. 1 is a schematic diagram of a multimodal dust sensor.

FIG. 2 is a probe volume into which a dust particle enters.

FIG. 3 is a signal at a photodetector from the particle entered the probe volume.

FIG. 4 shows operation of a multimodal dust sensor channel in a homodyne mode.

FIG. 5 shows operation of a single measurement channel of a multimodal dust sensor in fluorescent and homodyne modes.

FIG. 6 shows operation of a single fluorescent channel of a multimodal dust sensor in fluorescent mode.

DETAILED DESCRIPTION

There is provided a multimodal dust sensor capable of simultaneously determining the concentration, size and origin of dust particles in real time. The inventive sensor can determine dust concentration even in the range from 0.3 $mg/m^3$, and also has a compact size.

The present invention ensures high accuracy in determining low concentrations of dust particles in air, including single dust particles, and simultaneous detection of concentration, size and origin of dust particles. Moreover, the sensor has a compact design suited for embedding into mobile devices, including e.g. smartphones. With the present invention, ambient air quality can be monitored using a smartphone having a dust sensor application.

The present invention offers the following advantages over the prior art:

- higher sensitivity of detection of dust particles owing to generation of various probe volumes in measurement channels;
- ability to determine the dust origin using fluorescent mode of operation;
- ability to determine the particle dust size and concentration using homodyne mode of operation.

The fact is that particles over 10 μm in size, entering the body with breathing through the nose, are mainly retained in the upper respiratory tract, while particles less than 5-10 μm penetrate into the lungs. Particles of up to 2.5 mm are of a particular danger to the health because they can participate in the gas exchange of pulmonary alveoli and are carcinogenic; moreover, particles less than 0.1 mm (100 nm) penetrate through the cell membranes and reach other organs of the body through the bloodstream.

Various dust origins are known, which can cause certain reactions of the living body and have different time of removal from the organism. The dust particles can be:

- fibrogenic,
- toxic,
- irritating,
- allergenic,
- carcinogenic,
- radioactive for the body.

The most health-hazardous particulate matter includes:

PM10 (particles of about 2.5-10 μm in size) such as dust, pollen, mold.

The short-term standard is about 150 μg/m$^3$ (there is currently no long-term standard);

PM2.5 (particles of <2.5 μm in size) such as combustion products of organic particles, produced from all types of combustion, including car exhaust, power plant emissions, forest fires, agricultural burning, and some industrial processes.

The short-term standard (e.g., daily average) is about 35 micrograms per cubic meter of air (μg/m$^3$) and the long-term standard (annual average) is 15 μg/m$^3$. The short-term standard is the maximum allowable concentration of particles when the body is exposed to it around the clock.

The long-term standard is the maximum allowable annual average particle concentration.

The multimodal dust sensor according to the invention measures concentrations of PM10, PM2.5 and also detects single dust particles and determines size and origin of dust particles. The sensor can be employed for personal use being embedded in a smartphone and household appliances (vacuum purifiers, air conditioners, air purifiers, etc.).

The present sensors can also be used in regions with specific weather conditions: sandstorms, forest fires, etc. They can also determine indoor air quality, for example, to evaluate quality of cleaning, air quality for allergic persons, etc.

FIG. 1 shows a schematic diagram of a multimodal dust sensor.

The sensor (e.g., the multimodal dust sensor) comprises, arranged in succession, an array of lasers assembled on a single substrate or manufactured in a single process; the laser array is combined with an array of collimator microlenses, a beam splitter, an array of focusing microlenses, an array of dichroic lenses and an array of photodetectors disposed after the array of dichroic lenses. Each focusing microlens is disposed opposite a respective collimator microlens. Furthermore, the laser, collimator lens, focusing lens are arranged along a first optical axis. The dichroic mirror and the photodetector located after it, the dichroic filter and the photodetector located after it are arranged along a second optical axis. Moreover, the first and second optical axes intersect at a point located on the splitter and form a measurement channel. Using said laser array, collimator lens array, focusing lens array, dichroic lens array with respective photodetector array, dichroic filter array with respective photodetector array, a plurality of measurement channels (e.g., a homodyne channel and/or a fluorescent channel) can be formed, which can work both individually and in cooperation with each other.

The focusing lens array focuses a first portion of the laser radiation that has passed the beam splitter, and forms a plurality of probe volumes.

In this context, probe volume is the space in which laser radiation is focused, so the intensity of scattered and fluorescent light will be the highest just in this space. It should be noted that in reality the beam is not focused to a point, and the focusing area is a constriction with an approximately appraised size of about 5-10 mm and a focus length of about 30-50 mm.

Dust particles enter the probe volumes. Radiation scattered by the dust particles is returned to the splitter and, having been reflected from it, enters the photodetector through a dichroic filter. Second portion of the laser radiation, passed through the beam splitter, also enters the photodetector. In this case, the Doppler effect invokes scattering of radiation from the moving dust particle, and this effect can be registered owing to the use of homodyne detection.

Fluorescence of dust particles, induced by laser radiation, returns to the splitter; a portion enters the dichroic filter that does not transmit fluorescent light, reflects from the dichroic filter, having passed through the splitter, passes through the dichroic mirror and enters the photodetector that registers the fluorescence.

Each of the probe volumes corresponds to own measurement channel and can be analyzed separately and individually. That is independent measurement channels (e.g., a homodyne channel and/or a fluorescent channel) with independent probe volumes can be formed. The lasers forming the laser array can operate both at the same wavelength and at different wavelengths. The probe volume can be modified using optical elements with required specific parameters in each certain case. It means that the probe volume can be modified by varying the parameters of the collimating and focusing lenses through a change in the laser wavelength.

FIG. 2 shows a probe volume into which a dust particle enters.

As seen in FIG. 2, probe volume is a space in the form of a constriction, and it apparent that upon entering the probe volume, the dust particle is irradiated with a focused beam, i.e. the intensity of scattered radiation from the particle will be the highest just in this space.

FIG. 3 shows the time dependence of homodyne component of the photocurrent.

The graph shows signals on the photodetector from several particles of different size (e.g., 10 mm, 2.5 mm, 1 mm, or the like) that entered the probe volume. It is apparent that backscattering depends on the particle size—large particles scatter more, small particles less. It means that the particle size can be estimated based on amplitude (A) of the signal. Use of the present sensor enables determining the size of each dust particle individually.

Particle size can be determined by the following formula (1):

$$i_{hom} = 2\sqrt{i_{LO} i_{scat}} \cos(w_d t + \Delta\varphi(x, y, z)) \tag{1}$$

$i_{hom}$—homodyne component of the photocurrent, resulting from combining a reference laser radiation and the scattered laser radiation at the sensitive area of the photodetector; the photocurrent component Thom is the result of combining two waves. In the case when the scattering object is moving towards/from the source, the Doppler effect contributes to this photocurrent ($W_d \neq 0$);

$i_{LO}$—photocurrent corresponding to laser radiation of the reference beam;

$i_{scat}$—photocurrent corresponding to laser radiation of the scattered beam;

$W_d$—Doppler frequency shift of laser radiation (difference between frequencies of reference radiation and the radiation scattered by the moving object);

t—time;

$$\Delta\varphi(x, y, z) = \varphi_{LO} - \varphi_{scat}$$

—phase difference of oscillations of the reference and scattered beams;

$\varphi_{LO}$—phase of oscillations of laser radiation of the reference beam;

$\varphi_{scat}$—phase of oscillations of laser radiation of the scattered beam.

By the formula (1), the Doppler frequency shift, $W_d$, of laser radiation is determined.

The number of particles per unit volume is related to the concentration of particles as follows (particles are assumed to be spherical):

$$N_V = \frac{C}{\rho * 4/3^{\pi \cdot R^3}} \quad (2)$$

$N_v$—number of particles per unit volume, ($1/m^3$);

ρ—particle density, ($kg/m^3$);

R—particle radius, (m);

C—concentration of particles, ($kg/m^3$).

Registration of single particles and measurement of their velocity enable determining Nv:

$$N_v = \frac{N}{v \cdot t \cdot S} \quad (3)$$

N—number of registered particles;

t—measurement time, (s);

S—effective surface area of the probe volume, ($m^2$). (probe volume is the space area where the laser radiation is focused);

v—particle velocity (m/s), which is determined from the measurement of the Doppler shift of the radiation frequency.

Furthermore, the particle velocity is determined from the equation:

$$v = W_d * C/W_{LO} \quad (4)$$

C—velocity of light;

$W_{LO}$—laser radiation frequency.

Thus, having determined $W_d$ from equation (1) and then the particle velocity from equation (4), the concentration of particles in the probe volume can be determined using equation (2).

FIG. 4 shows in detail operation of a channel of a multimodal dust sensor in homodyne mode.

Homodyne reception (mode) is a coherent reception based on combining two electromagnetic waves—reference and signal. In contrast to heterodyne reception, both waves have one radiation source. As can be seen from formula (1), homodyne signal depends on the phase difference of reference and scattered waves Δφ(x, y, z), hence, this method can be used for phase demodulation of registered signal. It is the homodyne signal that depends on the radiation frequency Doppler shift $W_d$, and particularly this method is used to determine the particle velocity in the present invention. Moreover, the homodyne signal is also proportional to the amplitude of reference radiation, which ensures amplification of a small signal induces by scattering by a single particle. The homodyne mode is a key one and prerequisite for operation of the present dust sensor.

As shown in FIG. 4, the laser radiation is collimated by a collimating lens 1; the collimated laser radiation passes through a beam splitter 2, which splits the radiation into two beams. Second reference beam 3, reflected from the splitter, falls on a dichroic mirror, and, reflected therefrom, passes through the splitter 2 and falls via the dichroic filter on the photodetector 5.

If dust particles enter not only the probe volume, they will also scatter light and fluoresce, but with a lower intensity than in the probe volume, i.e. the contribution of radiation from such particles can be neglected because of its smallness since most of the radiation energy is concentrated in probe volume.

When the medium under analysis is a collection of moving particles, the problem of multiparticle scattering arises, which contributes to the frequency structure of the photoelectric current and distorts the measurement results. Studies performed by the inventors showed that for PM2.5 particles moving with velocities of about 0.1 mm/s, the contribution of single events is the main one up to the concentrations of about tens of $mg/m^3$, which is an extremely large value. In general, this error is unrecoverable, however, it appears at extremely high concentrations of dust particles, at which the use of this sensor is impractical.

To detect a moving particle by the Doppler frequency shift, it is necessary to register this shift; this requires a certain time depending on the reference frequency. Since optical radiation has extremely high frequencies, this time interval can be considered infinitely small for any electronic registration system. Thus, at a particular instant, when radiation fell on a dust particle and it scattered light, the dust particle can be considered moving, and this gives the Doppler effect.

FIG. 4 shows that the first beam passes through a focusing lens and interacts with dust particles. Each dust particle, entering the probe volume, scatters the radiation incident thereon. The scattered radiation 4 goes back through the focusing lens to the splitter and, reflected from the splitter, combines with the second reference beam.

When combining two waves, it is necessary to identify the element (detector) on which the combining takes place. To register a frequency shift, the reference and scattered beams must be focused in the plane of the photodetector. The beams do not interact with each other in any way outside the detector plane.

Thus, two combined beams go through the dichroic filter to the photodetector 5, which registers the photocurrent homodyne component including the contribution from the Doppler effect. The dichroic filter transmits radiation at the laser wavelength and does not transmit radiation at wavelengths other than laser. Therefore, the photocurrent registered by the photodetector consists of three components: $i_{hom}$—homodyne photocurrent; $i_{LO}$—photocurrent corresponding to the laser radiation of the reference beam, and $i_{scat}$—photocurrent corresponding to laser radiation of the scattered beam. These components are frequency diverse, and since in this case particularly the room component is informative, which, as seen from equation (1), carries the Doppler frequency information, the $i_{LO}$ and $i_{scat}$ components can be filtered out. These components can be filtered out e.g. by an electric filter, besides the $i_{scat}$ is typically extremely small.

Then, the concentration of particles in the probe volume is calculated using the equations (1), (2), (4).

To determine the particle size, it is necessary to calibrate the amplitude of the sensor signal on particles with a specified size. This calibration is performed once (e.g. by the manufacturer). Polystyrene particles with the specified sizes can be used for calibration, which is a standard method in this field. To determine the particle size, the amplitude of the registered signal corresponding to passage of the particle through the probe volume is measured. The amplitude is compared with the values obtained from the calibration. Various scenarios are possible:

(1) particle size is taken to be equal to the closest calibration value in amplitude;

(2) dependence of the signal amplitude on the particle size, measured as a result of the calibration, is approximated by an analytical function from which the size of the unknown particle is determined.

The operation speed of the multimodal dust sensor can be increased by increasing the number of channels of the sensor since increase in the number of channels increases the number of probe volumes and, hence, the probability that dust particles enter the sensor. The number of measurement channels of the multimodal dust sensor can be increased (turned on) or decreased (turned off) by the sensor itself depending on the task, particularly, the device in which the sensor will be used. For example, in vacuum purifiers the number of working channels can be reduced because vacuum purifiers work with large concentrations of dust, and the dust concentration can be calculated at a high speed even when a small number of channels are turned on. In the devices like e.g. air conditioners, the sensor can automatically turn on a larger number of channels if the concentration calculation speed is insufficient, since dust concentration in the rooms where the air conditioners are used is not so high. The sensor can also adjust itself to flow rates of dust particles: with an increase in the particle flow rate the sensor can turn off some of the channels, and with a decrease in the flow rate the sensor can turn on the missing channels.

Change in characteristics of the focusing lens in the channel leads to variation in the probe volume. Moreover, the probe volume of each channel can be readjusted using liquid crystal lenses as focusing lenses. Focus of the lens can be changed simply by the voltage applied.

It should be noted that the probability that the same dust particle enters several probe volumes of the sensor channel is quite low, although this probability can also be taken into account in calculation of the concentration. Contribution of the radiation scattered from the particles entered the beam rather then the probe volume can be neglected due to its smallness.

FIG. 5 illustrates operation of a single channel of a multimodal dust sensor in a fluorescent and homodyne mode.

Laser radiation excites fluorescence in dust particles of certain origins.

Laser radiation is collimated by a collimating lens 1; the collimated laser radiation passes through a beam splitter 2, which splits the radiation into two beams. First beam passes through a focusing lens and interacts with dust particles. Under the effect of laser radiation, each dust particle entered the probe volume emits fluorescent light (4*a*) and/or scatters (4*b*) the laser radiation incident thereon. Fluorescent light 4*a* passes through the focusing lens, reflects from the splitter 2, falls on a dichroic filter capable of transmitting only laser radiation, and, reflected from the dichroic filter, passes through the splitter 2 and a dichroic mirror that reflects only laser radiation and transmits all other radiation, and focuses on a photodetector that registers the fluorescent light. Second reference beam 3 of the laser radiation, reflected from the splitter, falls on the dichroic mirror, and, reflected therefrom, passes through the splitter. In this case, the scattered radiation 4*b* passes through the focusing lens, reflects from the splitter and combines with the second reference beam 3. The combined radiation goes through the dichroic filter and focuses on a combined radiation photodetector 5*b*. It should be noted that the combined radiation photodetector detects only scattered radiation combined with laser radiation, while the photodetector 5*a* detects only fluorescent light.

The fluorescence mode determines the origin of dust particle, the homodyne mode determines the concentration of dust particles and the size of individual dust particles as described above. Combination of these two modes provides accurate and more detailed information for the user.

In the multimodal dust sensor, both modes of operation, fluorescent and homodyne, can be turned on simultaneously, or only one of them, either fluorescent or homodyne, can be turned on.

Now operation of a single measurement channel of the multimodal dust sensor only in the fluorescent mode will be described in more detail.

FIG. 6 illustrates operation of a measurement channel of the multimodal dust sensor in fluorescent mode of operation.

Laser radiation is collimated by a collimating lens; the collimated laser radiation passes through a beam splitter that splits the radiation into two beams. One of the beams reflects from the dichroic mirror and does not participate in the fluorescent mode. The other beam passes through a focusing lens and interacts with dust particles. Each dust particle entering the probe volume fluoresces under the laser radiation (scattering is not considered in this mode). Fluorescent light from the dust particle passes through the focusing lens, reflects from the splitter, falls on the dichroic filter that does not transmit fluorescent light, and, reflected from the dichroic filter, passes through the splitter and the dichroic mirror that transmits fluorescent light, and focuses on a fluorescent light photodetector.

As mentioned above, the origin of a dust particle is determined by fluorescence. The multimodal dust sensor can be configured to determine substantially any origin of dust. Almost all kinds of dust fluoresce under a respective specific wavelength. It is known that particles of biological origin, such as dead skin particles, various mold spores, fungi, pollen, have fluorescence in different spectral regions. It is also known that mineral dust can fluoresce or not fluoresce, e.g. particles of sand (quartz) fluoresce, while coal dust does not.

Fluorescence spectra of various dust origins are known in the art, for example, from Yong-Le Pa, Detection and characterization of biological and other organic-carbon aerosol particles in atmosphere using fluorescence//Journal of Quantitative Spectroscopy & Radiative Transfer 150(2015) 12-35; and Voloshina O. V., Shirshin E. A., Lademann J., Fadeev V. V., Darvin M. E., Fluorescence detection of protein content in house dust: the possible role of keratin// Indoor Air 2017; 27: 377-385.

It is known that various dust particles of biological origin have similar fluorescence, therefore, if the sensor detects a fluorescence spectrum of this kind, it is concluded that the dust consists of particles of biological origin. For example, the fluorescence spectrum of keratin can be distinguished. It is a common knowledge that keratin is a protein whose amino acid composition can vary greatly depending on which body fragment it forms. For example, in humans, keratin is found in skin, nails and hair, in teeth. It means that if the multimodal dust sensor detects e.g. fluorescence of keratin, then the dust composition includes particles of biological origin. It is known that fluorescence of dust particles of biological origin can be excited by radiation with any wavelength in the range of 290-400 nm. For maximum intensity of fluorescence of a certain type of biological dust it is highly desirable to choose the optimal wavelength for this particular type of dust (this wavelength corresponds to the absorption maximum for this dust type). For example, the optimal excitation wavelength for keratin is about 350 nm.

Although the fluorescence spectra of particles of biological origin have a wide fluorescence band, they also have a spectral feature in the form of a narrow bright band in the region of 400 nm. Parameters of the dichroic minor can be chosen such that the minor transmits only the wavelength range e.g. in the region of this characteristic bright band, then the sensor channel will register particularly particles of biological origin.

It is a common knowledge that fluorescence spectra of various types of pollen have a characteristic fluorescence in the range of 650-700 nm in red light. That is, the presence of such a peak in the fluorescence spectrum determines that the dust particle is pollen. Moreover, to obtain fluorescence particularly from pollen particles, the dust is to be exposed to the wavelength closest to the pollen absorption maximums of various plants.

Fluorescence spectra e.g. of sand have a characteristic fluorescence in the range of 390-450 nm.

It means that by the presence of such a peak in the fluorescence spectrum the dust particle is determined as sand. Furthermore, to obtain fluorescence specifically from particles of mineral dust, the dust is to be exposed to the wavelength closest to the absorption maximums of mineral dust substances.

The table 1 below shows the dependence of signal characteristics in homodyne channel and fluorescent channel on the laser wavelength.

TABLE 1

| Particle | | Laser | Fluorescent channel | | Homodyne channel | |
|---|---|---|---|---|---|---|
| Origin | Size | wave length | Fluorescence wavelength | Signal intensity | Wave length | Signal intensity |
| Biological | 10 mm | 370 nm<br>280 nm | 460 nm (keratin fluoresces [1])<br>350 nm (tryptophan fluoresces [2]) | Strong<br>Strong | 370 nm<br>280 nm | Strong<br>Strong |
| | 1 mm | 370 nm<br>280 nm | 460 nm (keratin fluoresces [1])<br>350 nm (tryptophan fluoresces [2]) | Weak<br>Weak | 370 nm<br>280 nm | Weak<br>Weak |
| Pollen | 10 mm | 360 nm<br>360 nm | 480 nm (wide peak), 675 nm (narrow peak) (*S. angustifolium fluoresces* [3])<br>530 nm (wide peak) (*S. palustre fluoresces* [3]) | Strong<br>Strong | 360 nm<br>360 nm | Strong<br>Strong |
| | 1 mm | 360 nm<br>360 nm | 480 nm (wide peak), 675 nm (narrow peak) (*S. angustifolium fluoresces* [3])<br>530 nm (wide peak) (*S. palustre fluoresces* [3]) | Strong<br>*147Strong | 360 nm<br>360 nm | Strong<br>Strong |
| Mineral | 10 mm | 337 nm | 430 nm (wide peak), 550 nm (narrow peak) (sand fluoresces [4]) | Strong | 337 nm | Strong |
| | 1 mm | 337 nm | 430 nm (wide peak), 550 nm (narrow peak) (sand fluoresces [4]) | Weak | 337 nm | Weak |

The data is taken from the works:

[1] Voloshina O. V., Shirshin E. A., LademannJ., Fadeev V. V., Darvin M. E., Fluorescence detection of protein content in house dust: the possible role of keratin // Indoor Air 2017; 27: 377-385;
[2] Yong-Le Pa, Detection and characterization of biological and other organic-carbon aerosol particles in atmosphere using fluorescence // Journal of Quantitative Spectroscopy & Radiative Transfer 150(2015)12-35;
[3] Justyna Urbanczyk, Maria Angeles Fernandez Casado, Tomas E. Diaz, Patxi Heras, Marta Infante, Angeles G. Borrego. Spectral fluorescence variation of pollen and spores from recent peat-forming plants // International Journal of Coal Geology, 131 (2014) 263-273;
[4] A. R. Mack and E. J. Brach. Laser fluorescence of sand and clay materials // Canadian journal of soil science. Vol. 57, No. 1, 1977.

Therefore, knowing the characteristic spectra of various dust origins, parameters of the dichroic minor of each channel of the multimodal dust sensor can be adjusted to any desired type of spectrum, and then the sensor will be able to register and determine several dust origins at the same time. Also, by changing the laser radiation wavelength in each of the channels it is possible to affect the dust, thereby obtaining fluorescence of one or another dust origin. Adjustment of parameters of the dichroic minor and the laser radiation wavelength in each channel can be used, depending on the tasks, both together and separately.

The beam splitter is one of the key elements of the inventive multimodal dust sensor. The beam splitter can be of any conventional design for splitting radiation.

The lasers can be any conventional lasers, including reconfigurable diode lasers with controlled wavelength.

It is apparent that the probability that a dust particle enters the multimodal dust sensor is directly proportional to the number of channels used. That is, the larger the laser array, the higher the sensitivity of the multimodal dust sensor.

The present invention can apparently find wide application in household appliances e.g. vacuum purifiers, air conditioners, etc. Moreover, due to its compact size, the multimodal dust sensor can be embedded into an ordinary smartphone. Therefore, a common user can use own smartphone to get information about the concentration and type of allergens in the air, which is important for allergic persons. Furthermore, a smartphone user living in an environmentally unfavorable area will be able to independently control the concentration and type of hazardous impurities in the air.

As described above, a multimodal dust sensor according to various example embodiments may include: an array of lasers; an array of collimating lenses, each of the collimating lenses arranged after a respective laser; an array of focusing lenses, each of the focusing lenses disposed opposite a respective collimating lens; a first array of photodetectors; an array of dichroic mirrors, each of the dichroic mirrors being followed by one of photodetectors of the first array of photodetectors; a second array of photodetectors; an array of dichroic filters, each of the dichroic filters being followed by one of photodetectors of the second array of photodetectors; and a beam splitter disposed between the array of dichroic filters and dichroic mirrors and between the arrays of focusing and collimating lenses at the intersection points of optical axes of the first and second arrays of optical axes.

Wherein each dichroic filter is disposed opposite a respective dichroic mirror such that each dichroic filter with its respective elements: a photodetector of the second array of photodetectors, a dichroic minor, a photodetector of the first array of photodetectors are arranged on the same optical axis, and said axes form a second array of optical axes.

Wherein optical axes of the first array of optical axes and the second array of optical axes are perpendicular to each other; wherein each laser from the array of lasers with the respective focusing and collimating lenses are arranged on the same optical axis, and optical axes for different lasers from the array of lasers are parallel to each other and form a first array of optical axes.

According to various embodiments, the beam splitter may be oriented such that the radiation propagating along the optical axis of the first array of optical axes from the laser to the focusing lens is partially directed along one of the optical axes of the second array of optical axes towards one of their dichroic filters. Wherein the radiation propagating along the optical axis of the second array of optical axes in the opposite direction from the focusing lens to the collimating lens is partially directed along the respective optical axis of the second array of optical axes towards the dichroic mirror, and each pair of optical axes from the first and second array of optical axes, intersecting at a point located on the splitter, forms a measurement channel.

According to various embodiments, the array of lasers consists of lasers operating at the same wavelength. According to various embodiments, the array of lasers can consist of lasers operating at different wavelengths.

According to various embodiments, the first photodetector may be registered only combined scattered and laser radiation, the dichroic mirror may be reflected laser radiation, and the dichroic filter may be transmitted the combined scattered and laser radiation. According to various embodiments, the second photodetector may be registered only fluorescent light, the dichroic mirror may be transmitted fluorescent light and reflects laser radiation, the dichroic filter may be reflected fluorescent light.

According to various embodiments, the focusing lenses can be liquid crystal.

According to various embodiments of the disclosure, a method for operating of a single measurement channel of a multimodal dust sensor may include collimating laser radiation; splitting the laser radiation into two beams (e.g., a first beam and a second beam); and focusing the first beam to form a probe volume.

Wherein, a dust particle entering the probe volume:

a) scatters the first beam, thereby providing a homodyne mode of operation, in which the second beam and the scattered first beam are combined; the combined radiation falls on the photodetector that registers the Doppler effect; and/or b) fluoresces, thereby providing a fluorescent mode of operation, in which the fluorescent light falls on the photodetector that registers the fluorescent light.

According to various embodiments, signal in the homodyne channel has the following characteristics:

amplitude depends on the particle size;

duration (time of flight of a particle through the probe volume) and the modulation frequency of the signal depends on the velocity of the particle.

According to various embodiments, signal in the fluorescent channel has the following characteristics:

amplitude depends on the particle origin (main contribution) and particle size (much less significant contribution);

duration (time of flight of a particle through the probe volume) of the signal depends on the velocity of the particle.

Although the invention has been described in connection with some illustrative embodiments, it should be appreciated that it is not limited to these specific embodiments. On the contrary, it is assumed that the invention includes all the alternatives, amendments and equivalents that may be within the essence and scope of the claims.

Furthermore, the invention retains all the equivalents of the claimed invention, even if the claims are amended in the examination procedure.

What is claimed is:

1. A multimodal dust sensor comprising:

an array of lasers;

an array of collimating lenses for collimating laser radiation;

an array of focusing lenses for focusing a beams of the laser radiation respectively;

a first array of photodetectors;

a second array of photodetectors;

an array of dichroic mirrors;

an array of dichroic filters; and a beam splitter disposed between the collimating lenses and the focusing lenses and configured to split collimated laser radiation into two beams of a first beam and a second beam among the beams, wherein the multimodal dust sensor is configured to:

form a probe volume by focusing the first beam of the laser radiation through the focusing lenses, wherein the first beam is scattered by dust particles entering the probe volume, combine the first beam scattered by the dust particles and the second beam of the laser radiation passed through the beam splitter, detect, through the first array of photodetectors, a photocurrent resulting from combining the first beam and the second beam, and output a value related to the dust particles based on the detected photocurrent, wherein the beam splitter is disposed between the array of dichroic filters and the array of dichroic mirrors, and between the array of focusing lenses and the array of collimating lenses, wherein the collimating lenses and the focusing lenses define a first array of optical axes and the first array of photodetectors and the second array of photodetectors define a second array of optical axes, and wherein the first array of optical axes and the second array of optical axes intersect at a point located on the beam splitter and form a measurement channel.

2. The multimodal dust sensor of claim 1, wherein each probe volume being a space into which dust particles enter and in which laser radiation is focused.

3. The multimodal dust sensor of claim 1, wherein the dust particles entering the probe volume:

a) scatters the first beam, thereby providing a homodyne mode of operation, in which: the second beam and the scattered first beam are combined, and the combined radiation falls on a photodetector of the first array of photodetectors that registers the Doppler effect; and/or b) fluoresces, thereby providing a fluorescent mode of operation, in which:

fluorescent light falls on a photodetector of the second array of photodetectors that registers the fluorescent light.

4. The multimodal dust sensor of claim 1, wherein the multimodal dust sensor is configured to determine information about size, concentration and origin of the dust particles at a same time.

5. The multimodal dust sensor of claim 1, wherein the first array of optical axes and the second array of optical axes are perpendicular to each other.

6. The multimodal dust sensor of claim 1, wherein each pair of optical axes from the first array of optical axes and the second array of optical axes, intersecting at a point located on the beam splitter, forms a measurement channel.

7. The multimodal dust sensor of claim 6, wherein the multimodal dust sensor is configured to:

simultaneously provide a fluorescent mode of operation and a homodyne mode of operation in the measurement channel, and obtain information about size, concentration and origin of the dust particles at the same time based on the fluorescent mode of operation and the homodyne mode of operation.

8. The multimodal dust sensor of claim 7, wherein the multimodal dust sensor is configured to:

determine the origin of the dust particles using the fluorescent mode of operation, and determine the size and the concentration of the dust particles using the homodyne mode of operation.

9. The multimodal dust sensor of claim 1, wherein;

the first array of photodetectors comprises photodetectors of a first photodetector type, and the second array of photodetectors comprises photodetectors of a second photodetector type.

10. The multimodal dust sensor of claim 9, wherein each photodetector of the first photodetector array is arranged in correspondence with one the dichroic mirrors, one of the dichroic filters, and each photodetector of the second array of photodetectors and the each first photodetector and the dichroic mirror, the dichroic filter, and the second photodetector corresponding thereto are arranged along a respective one of a plurality of respective second optical axes each extending in a same second direction which crosses a first direction in which each first optical axes extends.

11. The multimodal dust sensor of claim 9, wherein photodetectors of the first photodetector array register combined scattered and laser radiation, the dichroic mirrors reflect laser radiation, and the dichroic filters transmit combined scattered and laser radiation.

12. The multimodal dust sensor of claim 9, wherein photodetectors of the second photodetector array register fluorescent light, the dichroic mirrors transmit fluorescent light and reflect laser radiation, and the dichroic filters reflect fluorescent light.

13. The multimodal dust sensor of claim 1, wherein intersection points of optical axes of the first optical axes and optical axes of the second optical axes provide measurement channels.

14. The multimodal dust sensor of claim 13, wherein the measurement channels comprise at least one of a homodyne channel or a fluorescent channel.

15. The multimodal dust sensor of claim 1, wherein each probe volume corresponds to a focusing point of one of the focusing lenses of focusing a first portion of laser radiation passing the beam splitter.

16. The multimodal dust sensor of claim 1, wherein each laser among the array of a plurality of lasers is arranged in correspondence with one of the collimating lenses, one of the focusing lenses, and one of the probe volumes and the each laser and the collimating lens, the focusing lens, and the probe volume corresponding thereto are arranged along one of a plurality of respective first optical axes each extending in a same first direction.

* * * * *